(12) United States Patent
Dugas

(10) Patent No.: US 12,530,729 B2
(45) Date of Patent: Jan. 20, 2026

(54) CROP DETECTION SYSTEM

(71) Applicant: DEERE & COMPANY, Moline, IL (US)

(72) Inventor: Bryan E Dugas, Thibodaux, LA (US)

(73) Assignee: DEERE & COMPANY, Moline, IL (US)

(*) Notice: Subject to any disclaimer, the term of this patent is extended or adjusted under 35 U.S.C. 154(b) by 399 days.

(21) Appl. No.: 18/335,425

(22) Filed: Jun. 15, 2023

(65) Prior Publication Data

US 2024/0087054 A1     Mar. 14, 2024

Related U.S. Application Data

(60) Provisional application No. 63/405,605, filed on Sep. 12, 2022.

(51) Int. Cl.
| | |
|---|---|
| *G06Q 50/02* | (2024.01) |
| *G01S 13/86* | (2006.01) |
| *G01S 17/86* | (2020.01) |
| *G06Q 50/00* | (2024.01) |

(52) U.S. Cl.
CPC ............ *G06Q 50/02* (2013.01); *G01S 13/867* (2013.01); *G01S 17/86* (2020.01)

(58) Field of Classification Search
CPC ...... G01S 13/867; G01S 17/86; G01S 13/865; G01S 17/88; G01S 13/58; G01F 23/2928; G01F 23/804; G06Q 50/02
See application file for complete search history.

(56) References Cited

U.S. PATENT DOCUMENTS

| | | | |
|---|---|---|---|
| 6,389,785 B1 | 5/2002 | Diekhans et al. | |
| 8,988,426 B2 | 3/2015 | Chen et al. | |
| 9,348,111 B2 | 5/2016 | Cohen et al. | |
| 9,723,784 B2* | 8/2017 | Bremer | G01G 19/12 |
| 10,091,934 B2 | 10/2018 | Dugas et al. | |
| 10,371,561 B2 | 8/2019 | Darr et al. | |
| 11,733,353 B2* | 8/2023 | Kumar | G06V 10/764 |
| 12,102,033 B2* | 10/2024 | Dugas | A01D 34/006 |

(Continued)

FOREIGN PATENT DOCUMENTS

| | | |
|---|---|---|
| CN | 1695419 A | 11/2005 |
| CN | 102379189 A | 3/2012 |

OTHER PUBLICATIONS

New Overhead Bin Scanning System Scans Fruit, Detects Trucks Without Human Input, Apr. 20, 2022, Posted in Autonomy & Robotics, PR Newswire, https://www.precisionfarmingdealer.com/articles/5051-new-overhead-bin-scanning-system-scans-fruit-detects-trucks-without-human-input (Year: 2022).*

*Primary Examiner* — Justin R Knapp
(74) *Attorney, Agent, or Firm* — Michael Best & Friedrich LLP

(57) ABSTRACT

A sugarcane sampling station includes a sugarcane sampling station including a structure defining a passageway through which a harvested material passes, a core sampler mounted to the structure, the core sampler comprising a coring rod configured to retrieve a sample of the harvested, a crop detection system mounted to the structure, the crop detection system comprising a sensing device configured to detect the harvested material, and a processor configured to determine a quality of the harvested material detected by the crop detection system based on an output of the sensing device.

21 Claims, 4 Drawing Sheets

(56) References Cited

U.S. PATENT DOCUMENTS

| | | |
|---|---|---|
| 2002/0014116 A1 | 2/2002 | Campbell et al. |
| 2003/0184747 A1 | 10/2003 | Diekhans et al. |
| 2004/0031335 A1 | 2/2004 | Fromme et al. |
| 2005/0027482 A1 | 2/2005 | Benaoudia et al. |
| 2006/0026939 A1 | 2/2006 | Kormann |
| 2007/0262000 A1 | 11/2007 | Valerio |
| 2008/0156124 A1 | 7/2008 | O'Connor et al. |
| 2009/0036184 A1 | 2/2009 | Craessaerts et al. |
| 2010/0269470 A1 | 10/2010 | Price |
| 2011/0166788 A1 | 7/2011 | Griffin |
| 2012/0004815 A1 | 1/2012 | Behnke |
| 2012/0301032 A1 | 11/2012 | Kawanishi et al. |
| 2013/0211675 A1 | 8/2013 | Bonefas |
| 2015/0022638 A1 | 1/2015 | Saeki |
| 2016/0078304 A1* | 3/2016 | Bremer .................. G01G 19/08 382/110 |
| 2025/0143236 A1* | 5/2025 | Andersson ............. B64U 20/80 |

* cited by examiner

CROP DETECTION SYSTEM

CROSS-REFERENCE TO RELATED APPLICATIONS

This application claims priority to U.S. Provisional Application No. 63/405,605, filed Sep. 12, 2022, the entire contents of which are incorporated herein by reference.

BACKGROUND

The present disclosure relates to a system for measuring the quality of harvested material such as sugarcane.

A sugarcane harvester severs sugarcane plants from the ground with a base cutter assembly and transports the severed plants to a set of chopping drums that chop the severed plant into smaller billets. The billets are sent through a cleaning arrangement to separate the billets from non-billet material such as leaves, dirt, and other trash. Passing through the cleaning system, the billets are then dispatched to stowed in, for example, a trailing vehicle. The dispatched billets from the trailing vehicle are transported to a mill where the harvested billets are processed.

SUMMARY

In one embodiment, a sugarcane sampling station includes a sugarcane sampling station including a structure defining a passageway through which a harvested material passes, a core sampler mounted to the structure, the core sampler comprising a coring rod configured to retrieve a sample of the harvested, a crop detection system mounted to the structure, the crop detection system comprising a sensing device configured to detect the harvested material, and a processor configured to determine a quality of the harvested material detected by the crop detection system based on an output of the sensing device.

In some embodiments, a transport vehicle is configured to drive through the passageway. In some embodiments, the coring rod is configured to retrieve the sample of the harvested material from within a trailer of the transport vehicle. In some embodiments, the sensing device is configured to detect the harvested material within the trailer.

In another embodiment, a crop detection system includes a structure defining a passageway under which a transport vehicle is configured to drive, a sensing device configured to detect a harvested material within a trailer of the transport vehicle, and a processor configured to determine a quantity and a quality of the harvested material based on an output of the sensing device.

In another embodiment, a crop detection system includes a structure separate from a harvesting vehicle and defining a passageway under which a harvested and unprocessed crop is viewable, a sensing device mounted to the structure and configured to detect the harvested and unprocessed crop, and a processor configured to determine a quantity and a quality of the harvested material based on an output of the sensing device.

In yet another embodiment, a crop detection system configured to determine a quality of a harvested material within a trailer of a transport vehicle includes a sensing device configured to analyze a visible layer of the harvested material within the trailer and a processor programmed to generate a topographical map based on the visible layer and calculate a quality of the material based on the topographical map.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Before any implementations of the disclosure are explained in detail, it is to be understood that the disclosure is not limited in its application to the details of construction and the arrangement of components set forth in the following description or illustrated in the following drawings. The disclosure is capable of supporting other implementations and of being practiced or of being carried out in various ways.

Figure 1:
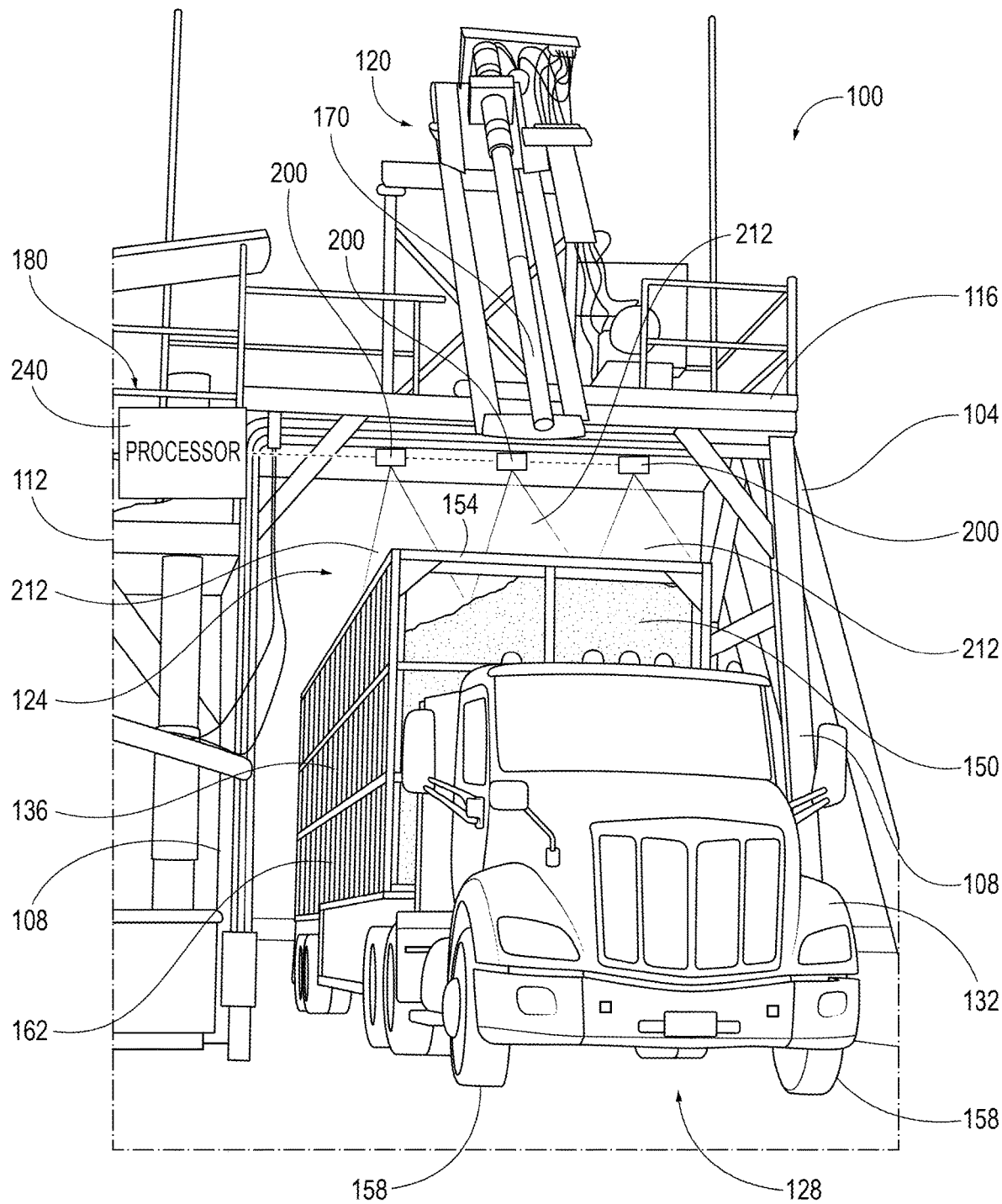
FIG. 1 is a perspective view of a sugarcane transport at a sampling station having an overhead crop detection system according to a first embodiment.

FIG. 1 illustrates a sugarcane sampling station 100 having a frame 104 comprising legs 108, a lower platform 112, an upper platform 116, an overhead core sampler 120, and a crop detection system 180. The legs 108 are supported on the ground and extend vertically upward from the ground to the upper platform 116. The upper platform 116 extends between two opposing sets of legs 108 to define a passageway 124 there below through which a sugarcane transport 128 is capable of driving. The legs 108 of the station 100 define a width of the passageway 124 through which the transport 128 passes and the upper platform 116, together with the ground define a height of the passageway 124 through which the transport 128 passes. The lower platform 112 is mounted to the legs 108 at a height below the upper platform 116 and outside of the passageway 124. The lower platform 112 may function as a control stand from which an operator may control the overhead core sampler 120 and the crop detection system 180.

Figure 2:
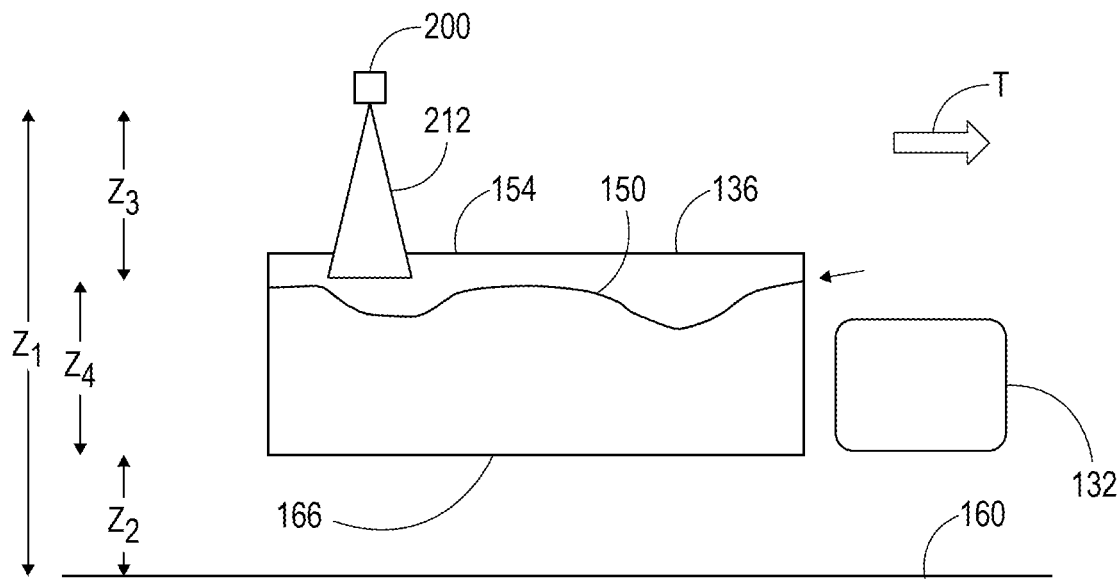
FIG. 2 is a schematic side view of the sugarcane transport of FIG. 1 relative to the overhead crop detection system of the sampling station.

The sugarcane transport 128 includes a truck 132 and a trailer 136 pulled by the truck 132 that contains the harvested sugarcane billets 150. The trailer 136 includes a substantially open top 154 or a top that is capable of opening such that the harvested sugarcane billets 150 are viewable and accessible via the top 154 of the trailer 136. The transport 128 is a road-going vehicle and includes a plurality of tires 158 that move the truck 132 and trailer 136 along the ground surface 160 (FIG. 2). In some embodiments, one or more of the lateral sidewalls 162 of the trailer 136 (that define a width of the trailer 136) may be open or include openings therein that permit viewing or removal of the sugarcane billet 150 through the sidewall. The transport 128 moves the billet material 150 harvested at the field to the sugarcane harvesting station 100 at, for example, a mill for processing the billet material 150. In some embodiments, the transport 128 is the vehicle 128 that trails the harvester in the field to collect the billet material 150 and in other embodiments is a separate over-the-highway vehicle that receives the billet material 150 from the field cart/trail vehicle.

The overhead core sampler 120 includes a coring rod 170 that takes a sample of the billet material 150 from within the trailer 136 of the transport vehicle 128. The coring rod 170 is moved (e.g., hydraulically, electrically, manually) downward from the upper platform 116 into harvested material 150 located within the trailer 136 through the open top 154 of the trailer 136. The coring rod 170 cuts through the height of the material 150 in the trailer 136 to extract a tube-shaped sample of the material 150 from within the trailer 136. This sample is shredded, pressed, and analyzed to determine an output 250: the quality of the sugarcane. The quality of the sugarcane is a measure of the percentage of the harvested and transported material 150 that is usable billet material 150 as opposed to extraneous plant matter, roots, root balls, debris, mud, and dirt.

The overhead core sampler 120 provides a representative sample of the crop 150 carried by the transport vehicle 128, through the representative sample may not be truly representative of the entirety of the material 150 hauled within the trailer 136. For example, the trailer 136 of the vehicle 128 may include twenty-eight tons of crop 150 (as calculated based on a weight of the transport vehicle scale at the mill). The coring rod 170 removes a sample from the trailer 136 that weighs approximately fifteen pounds, or approximately 0.02-0.03% of the total material 150. The fifteen-pound sample is shredded into a shredded sample, of which approximately 2.2 pounds (approximately 1000 grams) is removed for analysis. Juice is extracted from the shredded sample via pressing the remaining residue or cake is further analyzed. The 2.2 pounds that is analyzed corresponds to approximately 0.003% of the total material 150 in the trailer 136. In some instances, the overhead core sampler unit 120 is not utilized on every transport 128 entering the mill. In instances where only one of every three transports 128 is sampled, only 0.001% of the harvested crop 150 is tested.

Figure 5:
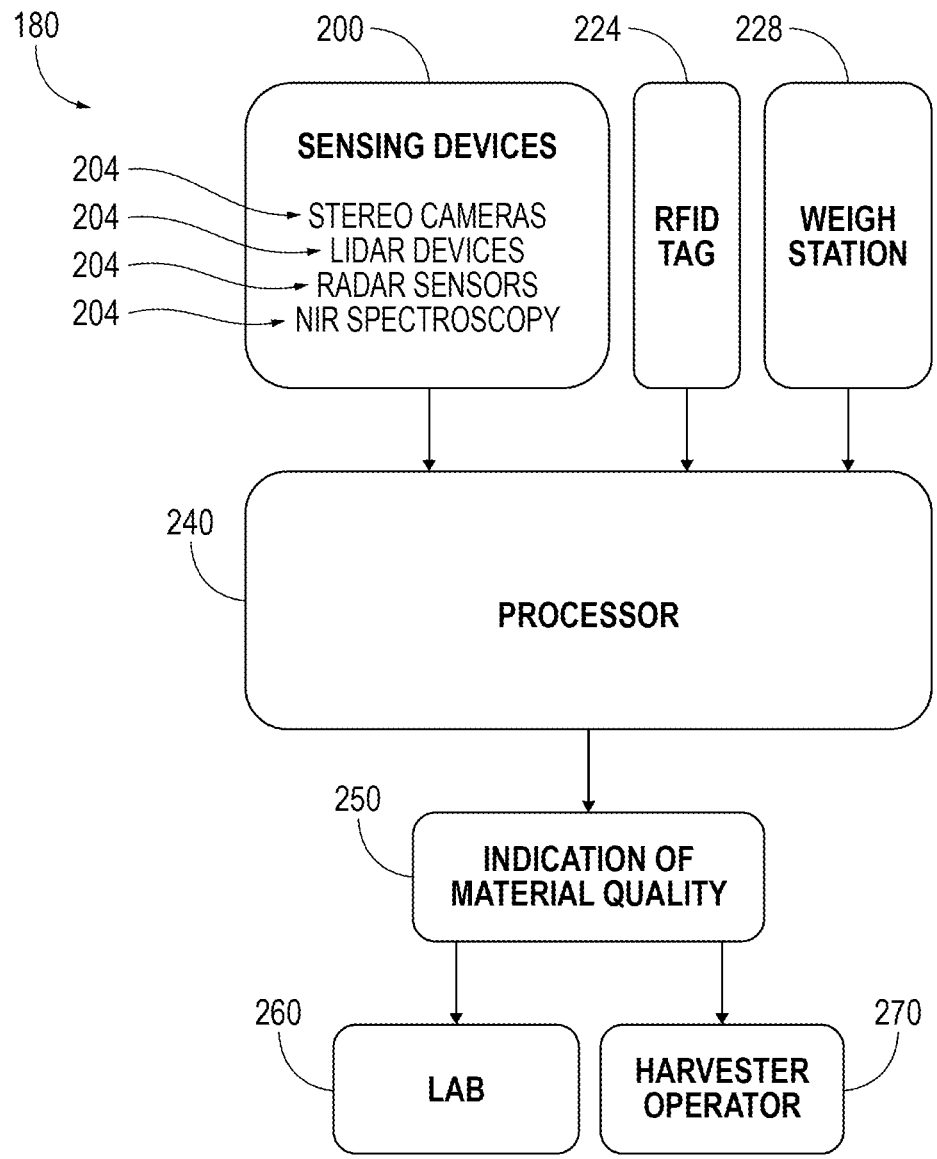
FIG. 5 is a schematic representation of the crop detection system.

The crop detection system 180, as shown in FIG. 5, is separate from the core sampler 120 and supplements the information gathered by the overhead core sampler 120. The crop detection system 180 includes one or more sensing devices 200 for analyzing the load 150 within the trailer 136 of the sugarcane transport 128 without physically engaging the load 150 (e.g., without taking a sample from the load 150). In some embodiments, such as the embodiment shown in FIGS. 1-3, each sensing device 200 includes a stereo camera 204 and/or a lidar device 208 mounted to the sampling station 100 and having a field of view 212 directed downward into the passageway 124 towards any sugarcane transport 128 that passes through the passageway 124. As shown, three sensing devices 200 are mounted to the underside of the upper platform 116 to generate a field of view 212 that is wide enough to capture the entire width X (FIG. 3) of the trailer 136 passing through the sampling station 100. In other embodiments, more (e.g., four, five, six) or fewer (e.g., one or two) sensing devices 200 may be utilized based on the achievable field of view 212 of each sensing device 200 or based on the desired field of view 212 (e.g., the entire width of the trailer 136, only a portion of the width of the trailer 136). Each stereo camera 204 analyzes, among other things, the topography of the load 150 within the trailer 136 as the transport 128 passes under and through the sampling station 100. With the open topped trailer 136, the upper surface of the material 150 within the trailer 136 is visible to the sensor assemblies mounted at a height above the trailer 136.

In some embodiments, the topography of the harvested material 150 is generated by identifying the distance between the sensing device 200 and the top of the material 150. The sensing device 200 is located a known distance $Z_1$ from a ground surface 160 on which the trailer 136 is transported. The base 166 of the trailer 136 (i.e., the surface of the trailer upon which the material 150 is located) is located a known, provided, or measured height $Z_2$ above the ground surface. The sensing device 200 measures the distance $Z_3$ (i.e., the vertical distance) between the sensing device 200 and the upper layer of the material 150, thereby generating the topographical map of the upper layer of the material 150. The height $Z_3$ of the material within the trailer 136 is calculated (by a processor 240) by subtracting the heights $Z_2$ and $Z_3$ from the mounting distance $Z_1$ of the sensing device 200.

The sensing devices 200 analyze the topography of the harvested material 150 within the trailer 136, as described above. Additionally, the sensing devices 200 may identify the perimeter of the trailer 136 so that the analyzed size of the trailer 136 can be compared to known data. One or more of the sensing devices 200 may additionally identify the speed of the trailer 136 as it passes through the passageway 124 (e.g., via a radar sensor 216) to provide relevant data for understanding and splicing the topographical images gathered by the stereo cameras 204.

The information gathered by the sensing devices 200 is transmitted, either via a wired connection or wirelessly via a wireless data transmission device, as an output or output signal to a processor 240 that is separate from the sensing devices 200. The processor 240 is programmed to analyze the information provided by the sensing devices 200 in addition to other information provided to the processor 240. The processor 240 may be located at, for example, the sampling station 100 or at the lab 260 that analyzes the core sample.

In addition to the information provided by the sensing devices 200, the processor 240 receives additional data relating to the transport vehicle 128. The weight of the vehicle 128 is measured via a vehicle 128 scale and transmitted or inputted into the processor 240. An identification number associated with the trailer 136 (e.g., an RFID tag 224) may be scanned or otherwise entered into the processor 240 to provide information relating to the dimensions (e.g., width, length) of the truck 132 and/or trailer 136, the height of the truck 132 bed, the field or farm from which the trailer 136 has harvested the crop 150 located within the trailer 136, the date and time of harvest or vehicle 128 arrival, and/or the crop 150 variety. The dimensional data of the trailer 136 is used by the processor 240 to confirm and/or correct the measured perimeter of the trailer 136 that is measured by the sensing devices 200. The weight of the transport vehicle 128 in combination with the truck 132 bed height and the topography determined by the sensing devices 200 provides an average density of the product within the trailer 136, which can be used to determine the quality of the crop 150 and/or the amount of impurities (e.g., mud, leafy trash, etc.) within the trailer 136. This information is used in combination with, or as a replacement for, the coring sample provided by the overhead core sampler 120 to further provide an identification of the quality of material 150 within the trailer 136. In contrast to the core sample taken by the core sampling machine, the information analyzed by the sensor system provides data indicative of the quality of the entirety of the material 150 within the trailer 136, rather than a fraction of a percent of the material 150.

Figure 3:
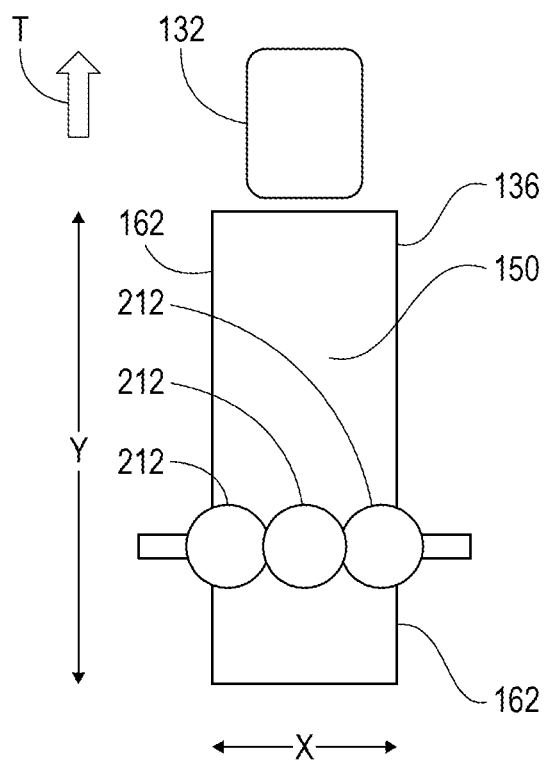
FIG. 3 is a schematic top view of the sugarcane transport of FIG. 1 relative to the overhead sensor of the sampling station.

In operation, a transport 128 having a trailer 136 containing harvested billet material 150 passes under the sugarcane sampling station 100 along the transport direction T (FIGS. 2-3). The transport 128 may stop at a position below the upper platform 116 of the station 100 such that the coring rod 170 of the overhead core is inserted into the material 150 within the trailer 136 of the transport 128 to extract a sample of the material 150 that is then sent to the lab 260 for testing. The sensing devices 200 (e.g., stereo camera 204, lidar devices 208) record the topography of the upper surface of the material 150 within the trailer 136 and transmit these images to the processor 240. The processor 240 splices together the various images taken by the different sensing devices 200 and generates an overall topographical map of the harvested material 150 within the trailer 136. The processor 240 combines the topographical map with other known variables such as the weight of the material 150 in the transport 128 (i.e., the known weight of the unloaded vehicle 128 subtracted from the measured weight of the loaded vehicle 128) and the known dimensions of the vehicle 128 (i.e., the width X and length Y of the trailer 136 as shown in FIG. 3) to calculate the density of the harvested material 150 within the transport 128. As leafy waste material 150 and dirt/mud have different densities than the desired billet material 150, the measured density provides an estimate of the quality of the material 150 within the trailer 136.

This estimate can also be compared to the material quality identified by the core sampler 120. If the quality of the sample material 150 approximately matches the quality identified by the crop detection system 180 (i.e., the sensing devices 200, the processor 240, and the additional inputs), this provides an indication that the cored sample may be representative of the entire load 150 within the transport 128. If the core sample indicates significantly higher or lower quality than what is determined by the crop detection system 180, the core sample may be unrepresentative of the entire load 150 within the transport 128. The information gathered by comparing the sampled and detected qualities of the material 150 may lead to increased or decreased rates of sampling and/or feedback provided to the grower regarding the quality of the material 150.

In addition to generating a topographical map of the material 150 within the trailer 136, the processor 240 is able to analyze the images generated by the sensor devices to differentiate between desired billet material 150 and extraneous plant matter and other undesirable material 150s (e.g., dirt, mud) based on the colors, shapes, and sizes detected within the images. This information is analyzed to determine a quality of the visible material 150 (e.g., the material 150 visible to the sensor devices), which can be compared to the quality of the core sample and the quality of the material 150 based on the calculated density. By comparing these three different values, the processor 240 can identify if the top layer is representative of the entire load 150 within the trailer 136.

Analyzing the load 150 via the crop detection system 180 takes significantly less time than the core sampler 120, resulting in a quicker drop off and analysis of the material 150 quality when used in place of the core sampler 120. When used in combination with the core sampler 120, it adds no additional time for the crop detection system 180 to operate as it is configured to record the images as the vehicle 128 passes under the sampling station 100 that takes the sample. The crop detection system 180 can therefore be utilized to record all loads entering the mill without a substantial increase in time.

In some embodiments, the crop detection system 180 is mounted to a structure that is separate from a sugarcane sampling station 100 that supports an overhead core sampler 120. The standalone structure may be a single-use apparatus at or near the mill and may be utilized entirely for supporting the crop detection system 180 at a height above a vehicle 128. Alternatively, the crop detection system 180 may be mounted and incorporated into other structures at or near the mill, such as at the weigh station 228, at an initial cane table, or at the entrance to the mill.

Further, in some embodiments, the crop detection system 180 does not analyze the trailer 136 of a transport vehicle 128 that provides the material 150 to the mill. In some embodiments, the transport vehicle 128 may unload the material from the trailer 136 into another vehicle at the mill yard, with this other vehicle being the transport analyzed via the crop detection system 180. In still other embodiments, the transport 128 may unload the harvested material 150 onto a prewash and leveling table where the material is then analyzed by the crop detection system.

Figure 4:
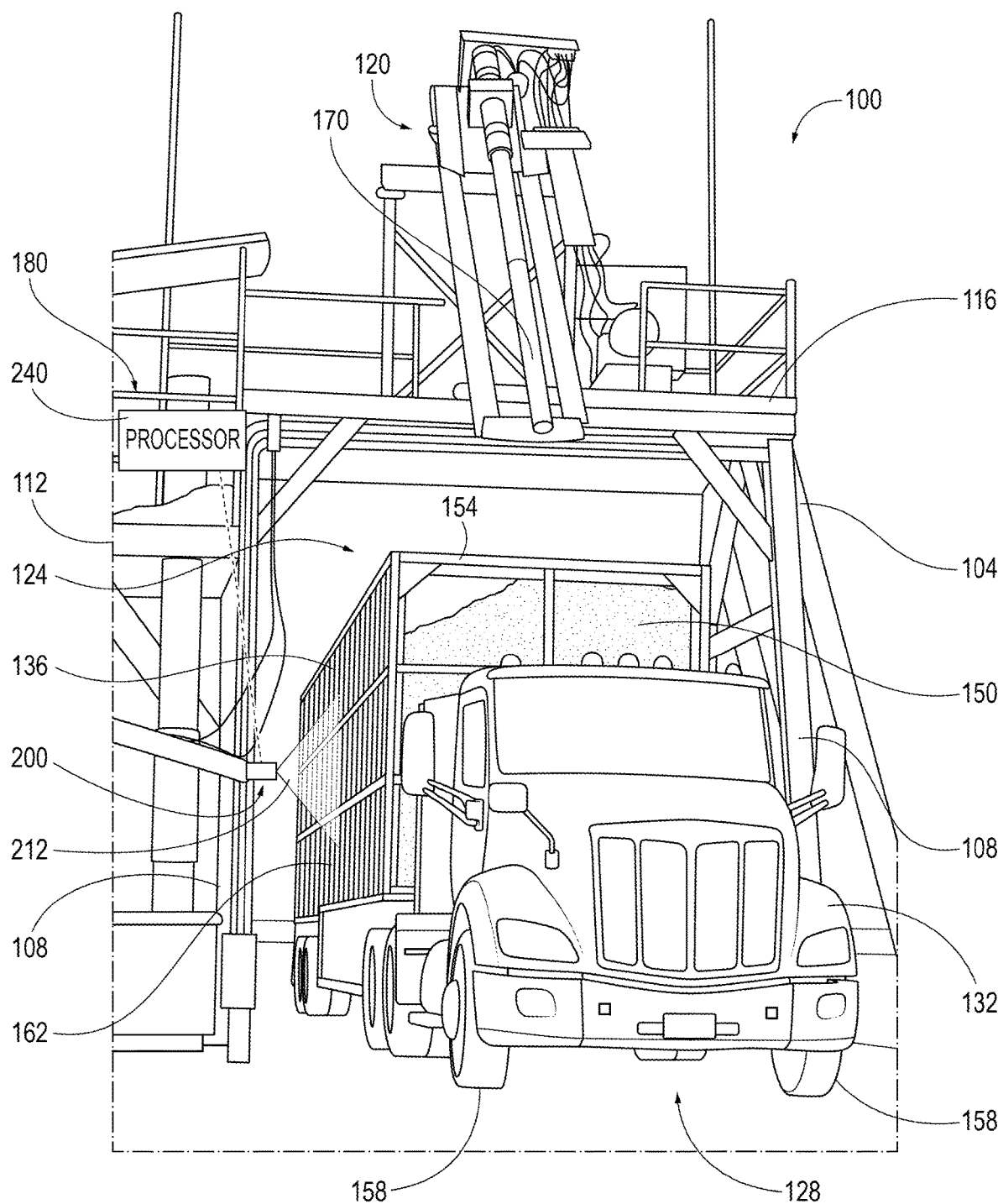
FIG. 4 is a perspective view of a sugarcane transport at a sampling station according to a second embodiment.

As shown in FIG. 4, an alternative crop detection system 180 can be utilized to analyze a side profile of the load 150 within the trailer 136 when the trailer 136 has an open side or has some visibility through a side of the trailer 136. The crop detection system 180 shown in FIG. 4 can be used as a substitute for the crop detection system 180 shown in FIG. 1 or may alternatively be used in combination with the crop detection system 180 shown in FIG. 1.

In addition to the stereo cameras 204 and lidar devices 208, the sensing systems may additionally or alternatively include near infrared (NIR) spectroscopy devices 220. The NIR spectroscopy devices 220 identify material 150 information that extends beyond the upper layer of the material 150 within the trailer 136 (which is visible to the stereo cameras 204). The NIR spectroscopy devices 220 view down into the material 150 beyond the surface level to identify moisture data and sugar content (i.e., Brix %, Pol %). This additional information is provided to the processor 240 for further refining the detected quality of the sugarcane.

The detected quality of the sugarcane based on the crop detection system 180 can be relayed to the operator 270 of a sugarcane harvester in the fields. For example, if the detected quality is indicative of too much waste material 150 being harvested, the operator 270 of the sugarcane harvester can modify settings (e.g., fan speed, deflection angle, cutting height, ground speed) of the harvester to decrease the harvest of the extraneous plant matter.

Various features of the disclosure are set forth in the following claims.

What is claimed is:

1. A sugarcane sampling station comprising:
    a structure defining a passageway through which a harvested material passes;
    a core sampler mounted to the structure, the core sampler comprising a coring rod configured to retrieve a sample of the harvested material;
    a crop detection system mounted to the structure, the crop detection system comprising a sensing device configured to detect the harvested material; and
    a processor configured to determine a quality of the harvested material detected by the crop detection system based on an output of the sensing device.

2. The sugarcane sampling station of claim 1,
wherein a transport vehicle is configured to drive through the passageway,
wherein the coring rod is configured to retrieve the sample of the harvested material from within a trailer of the transport vehicle, and
wherein the sensing device is configured to detect the harvested material within the trailer.

3. The sugarcane sampling station of claim 2, wherein the sensing device includes a stereo camera or a lidar device configured to take images of a top surface of the harvested material within the trailer.

4. The sugarcane sampling station of claim 3, wherein the sensing device further includes a radar sensor configured to measure a speed of the transport vehicle.

5. The sugarcane sampling station of claim 2, wherein the processor is programmed to generate a topographical map of an upper layer of the harvested material within the trailer.

6. The sugarcane sampling station of claim 5, wherein the processor is programmed to analyze the colors, shapes, and sizes of the topographical map to determine the quality of the harvested material.

7. The sugarcane sampling station of claim 5, wherein the processor is programmed to calculate a density of the harvested material within the trailer based on the topographical map.

8. The sugarcane sampling station of claim 2, wherein the sensing device includes a near infrared (NIR) spectroscopy device configured to identify moisture data and/or sugar content of the harvested material within the trailer.

9. The sugarcane sampling station of claim 1, wherein the processor is programmed to compare the quality of the harvested material detected by the crop detection system to a measured quality of the harvested material determined based on the sample retrieved by the core sampler.

10. A crop detection system comprising:
a structure defining a passageway under which a transport vehicle is configured to drive;
a sensing device configured to detect a harvested material within a trailer of the transport vehicle; and
a processor configured to determine a quality of the harvested material based on an output of the sensing device,
wherein the sensing device includes a stereo camera or a lidar device configured to take images of a top surface of the harvested material within the trailer.

11. The crop detection system of claim 10, wherein the sensing device further includes a radar sensor configured to measure a speed of the transport vehicle.

12. The crop detection system of claim 10, wherein the processor is programmed to generate a topographical map of an upper layer of the harvested material within the trailer.

13. The crop detection system of claim 12, wherein the processor is programmed to analyze the colors, shapes, and/or sizes of a plurality of areas of the topographical map to determine the quality of the harvested material.

14. The crop detection system of claim 12, wherein the processor is programmed to calculate a density of the harvested material within the trailer based on the topographical map.

15. The crop detection system of claim 10, wherein the processor is programmed to compare the quality of the harvested material detected by the crop detection system to a measured quality of the harvested material determined based on a sample retrieved by a core sampler.

16. The crop detection system of claim 10, wherein the sensing device includes a near infrared (NIR) spectroscopy device configured to identify moisture data and/or sugar content of the harvested material within the trailer.

17. A crop detection system configured to determine a quality of a harvested material within a trailer of a transport vehicle, the crop detection system comprising:
a sensing device configured to analyze a visible layer of the harvested material within the trailer; and
a processor programmed to:
generate a topographical map based of the visible layer; and
calculate a quality of the material based on the topographical map.

18. The crop detection system of claim 17, wherein the processor is programmed to calculate a quality of the material based on the topographical map by:
determining a weight of the harvested material within the trailer;
calculating a density of the harvested material based on the weight and the topographical map; and
comparing the calculated density to the density of a desired billet material.

19. The crop detection system of claim 17, wherein the processor is programmed to calculate a quality of the material based on the topographical map by analyzing the colors, shapes, and/or sizes of a plurality of areas of the topographical map.

20. The crop detection system of claim 17, wherein the sensing device includes a stereo camera and/or a lidar device.

21. A crop detection system comprising:
a structure separate from a harvesting vehicle and defining a passageway under which a harvested and unprocessed crop is viewable,
a sensing device mounted to the structure and configured to detect the harvested and unprocessed crop, and
a processor configured to determine a quantity and a quality of the harvested and unprocessed crop based on an output of the sensing device,
wherein the sensing device includes a near infrared (NIR) spectroscopy device configured to identify moisture data and/or sugar content of the harvested and unprocessed crop.

* * * * *